US012679422B2

(12) United States Patent
Oguri et al.

(10) Patent No.: US 12,679,422 B2
(45) Date of Patent: Jul. 14, 2026

(54) STORAGE MEDIUM FOR EXECUTING STEERING ANGLE CONTROL BASED ON COMMUNICATION BETWEEN VEHICLE CONTROL DEVICE AND AUTONOMOUS DRIVING SYSTEM

(71) Applicant: TOYOTA JIDOSHA KABUSHIKI KAISHA, Toyota (JP)

(72) Inventors: Haruki Oguri, Toyota (JP); Kenichi Yamada, Nisshin (JP); Hirohito Ide, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 18/648,780

(22) Filed: Apr. 29, 2024

(65) Prior Publication Data

US 2025/0010889 A1    Jan. 9, 2025

(30) Foreign Application Priority Data

Jul. 7, 2023    (JP) ................................ 2023-112350

(51) Int. Cl.
B60W 60/00        (2020.01)
(52) U.S. Cl.
CPC .... B60W 60/0053 (2020.02); B60W 60/0018 (2020.02); B60W 2510/20 (2013.01); B60W 2710/207 (2013.01)
(58) Field of Classification Search
CPC ......... B60W 60/0053; B60W 60/0018; B60W 2510/20; B60W 2710/207
See application file for complete search history.

(56) References Cited

U.S. PATENT DOCUMENTS

| | | | |
|---|---|---|---|
| 2017/0303842 A1 | 10/2017 | Yoshida et al. | |
| 2019/0299927 A1* | 10/2019 | Ando | B60K 28/12 |
| 2019/0300008 A1 | 10/2019 | Ando | |
| 2020/0139990 A1* | 5/2020 | Hiruma | G08G 1/16 |
| 2020/0264606 A1 | 8/2020 | Kuwahara | |

(Continued)

FOREIGN PATENT DOCUMENTS

| | | |
|---|---|---|
| JP | 2011-031659 A | 2/2011 |
| JP | 2016-064773 A | 4/2016 |

(Continued)

*Primary Examiner* — James J Lee
*Assistant Examiner* — Steven Vu Nguyen
(74) *Attorney, Agent, or Firm* — Sughrue Mion, PLLC

(57)        ABSTRACT

The vehicle control program is executed in a VCIB connected between DS and VP that performs autonomous driving in accordance with a command from DS. VCIB includes a memory in which a program including a predetermined API defined for each signal is stored, and a processor that controls VP in response to an instruction from DS by executing the program. VCIB has a manual/automatic mode. VP can accept a manual driving operation in the manual mode, and can accept a command from DS in the automated mode. The vehicle control program causes the processor to execute a step of executing a process for starting the limp-home travel by ICM that differs from VCIB on the condition that communication between DS and VCIB is impossible, and a step of switching from the automated mode to the manual mode on the condition that the limp-home travel by ICM is started.

9 Claims, 4 Drawing Sheets

(56)     References Cited

U.S. PATENT DOCUMENTS

| | | |
|---|---|---|
| 2023/0011677 A1* | 1/2023 | Li ........................... H04L 69/40 |
| 2023/0116293 A1 | 4/2023 | Ando et al. |
| 2025/0178619 A1* | 6/2025 | Ma ..................... B60W 50/038 |

FOREIGN PATENT DOCUMENTS

| | | |
|---|---|---|
| JP | 2019-077236 A | 5/2019 |
| JP | 2019-177807 A | 10/2019 |
| JP | 2020-131844 A | 8/2020 |
| JP | 2021-176100 A | 11/2021 |
| JP | 2023-048617 A | 4/2023 |

* cited by examiner

Figures 4A, 4B:
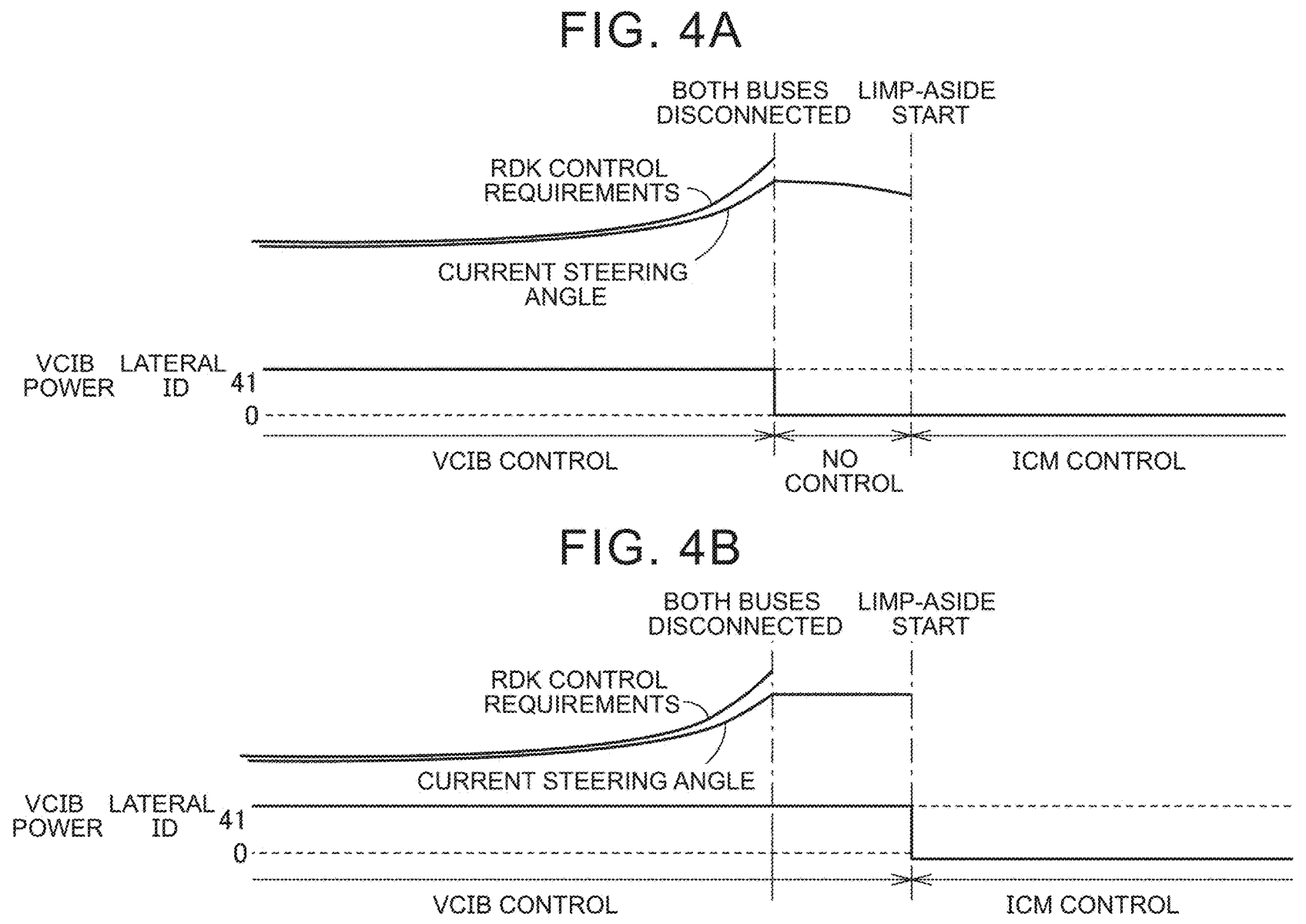

BOTH BUSES LIMP-ASIDE
DISCONNECTED START

RDK CONTROL
REQUIREMENTS

CURRENT STEERING
ANGLE

ICM CONTROL

NO
CONTROL

VCIB CONTROL

VCIB   LATERAL
POWER     ID

BOTH BUSES LIMP-ASIDE
DISCONNECTED START

RDK CONTROL
REQUIREMENTS

CURRENT STEERING ANGLE

ICM CONTROL

VCIB CONTROL

VCIB   LATERAL
POWER     ID

41

0

STORAGE MEDIUM FOR EXECUTING STEERING ANGLE CONTROL BASED ON COMMUNICATION BETWEEN VEHICLE CONTROL DEVICE AND AUTONOMOUS DRIVING SYSTEM

CROSS-REFERENCE TO RELATED APPLICATION

This application claims priority to Japanese Patent Application No. 2023-112350 filed on Jul. 7, 2023, incorporated herein by reference in its entirety.

BACKGROUND

1. Technical Field

This disclosure relates to a storage medium storing a vehicle control program, and particularly to a vehicle control program executed by a vehicle control device connected between an autonomous driving system and a vehicle platform that performs autonomous driving according to an instruction from the autonomous driving system.

2. Description of Related Art

There has been a system in which a vehicle and an information processing device cooperate to execute autonomous driving (see Japanese Unexamined Patent Application Publication No. 2019-177807 (JP 2019-177807 A), for example). In this system, the information processing device automatically generates control information using autonomous driving control software, and transmits the control information to the vehicle. The vehicle executes autonomous driving based on the received control information.

SUMMARY

The system according to JP 2019-177807 A is provided with a vehicle control device that receives the control information from the information processing device. The system is occasionally provided with a travel control device that receives an instruction from the vehicle control device and that controls travel of the vehicle, separately from the vehicle control device. It is conceivable that the travel control device controls limp-home travel of the vehicle when the limp-home travel is executed. It is conceivable that, during control of the limp-home travel by the travel control device, control of the limp-home travel and control according to a control request from the vehicle control device interfere with each other.

This disclosure has been made in order to address the above-described issue, and an object thereof is to provide a vehicle control program capable of suppressing interference between control of limp-home travel by a travel control device and control according to a control request from a vehicle control device.

An aspect of this disclosure provides a storage medium storing a vehicle control program executed by a vehicle control device connected between an autonomous driving system and a vehicle platform that performs autonomous driving according to an instruction from the autonomous driving system. The vehicle control device includes a memory that stores a program that includes a predetermined application program interface defined for each signal, and a processor that controls the vehicle platform according to the instruction from the autonomous driving system by executing the program.

The vehicle control device includes a manual driving mode and an autonomous driving mode as vehicle modes.

The vehicle platform is capable of receiving a manual driving operation in the manual driving mode, and receiving the instruction from the autonomous driving system in the autonomous driving mode.

The vehicle control program causes the processor to execute a process of causing a travel control device different from the vehicle control device to start limp-home travel on condition that communication between the vehicle control device and the autonomous driving system is disabled, and switch from the autonomous driving mode to the manual driving mode on condition that the limp-home travel is started by the travel control device.

According to such a configuration, the vehicle mode of the vehicle control device is switched from the autonomous driving mode to the manual driving mode on condition that the limp-home travel is started by the travel control device. Therefore, a control request is not output from the vehicle control device to the travel control device. As a result, it is possible to provide a vehicle control program capable of suppressing interference between control of limp-home travel by a travel control device and control according to a control request from a vehicle control device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a schematic configuration of a vehicle according to an embodiment of the present disclosure;

FIG. 2 shows a control system inside a vehicle;

FIG. 4A is a diagram for explaining transitions of the steering angle control when communication between DS and VCIB is interrupted; and FIG. 4B is a diagram for describing transitions in steering angle control when communication between DS and VCIB is interrupted.

DETAILED DESCRIPTION OF EMBODIMENTS

Figure 3:
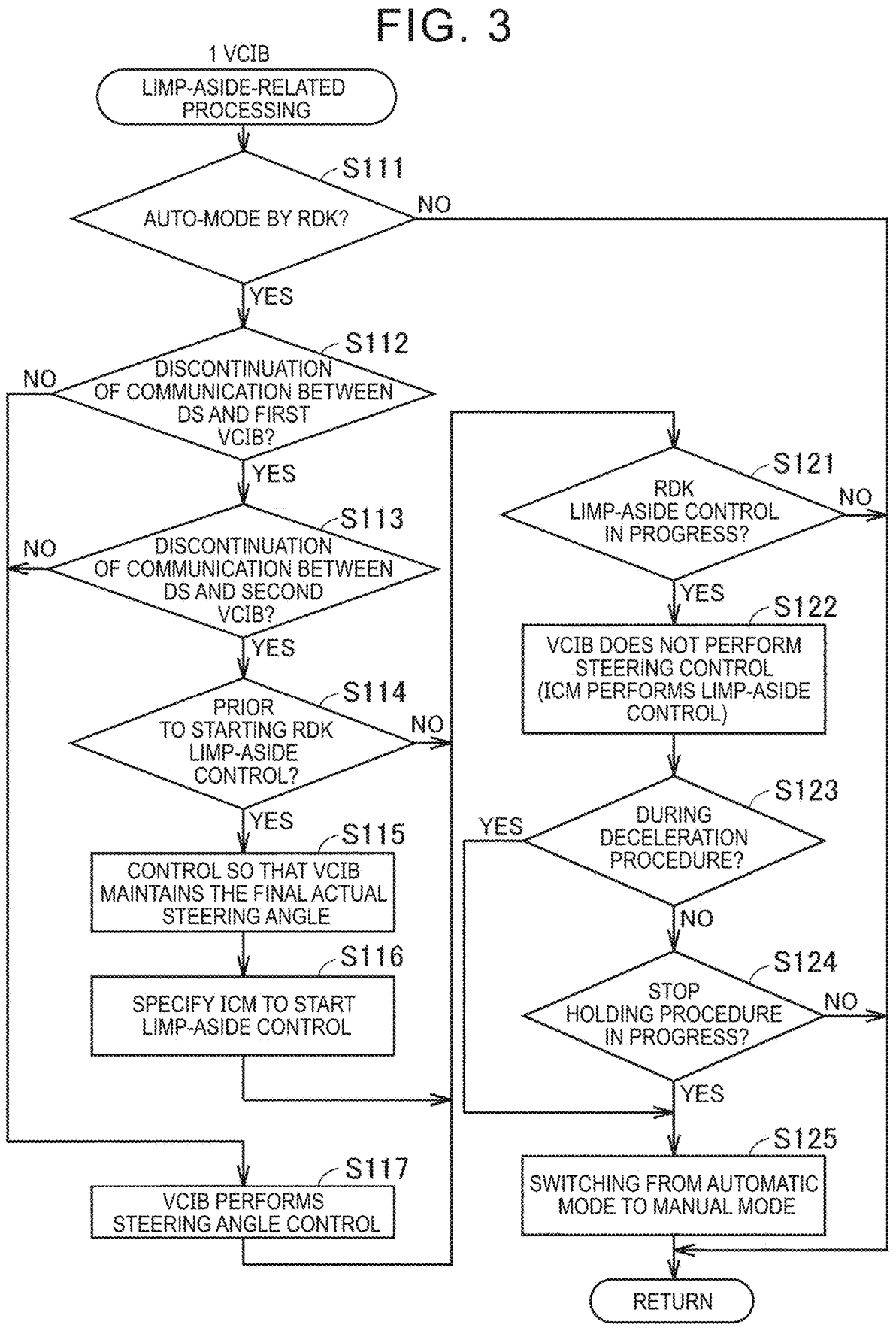
FIG. 3 is a flow chart illustrating a flow of a lymph-side relation process executed by VCIB.

Hereinafter, embodiments of the present disclosure will be described in detail with reference to the drawings. In the drawings, the same or corresponding portions are denoted by the same reference signs and the description thereof will not be repeated.

Figure 1:
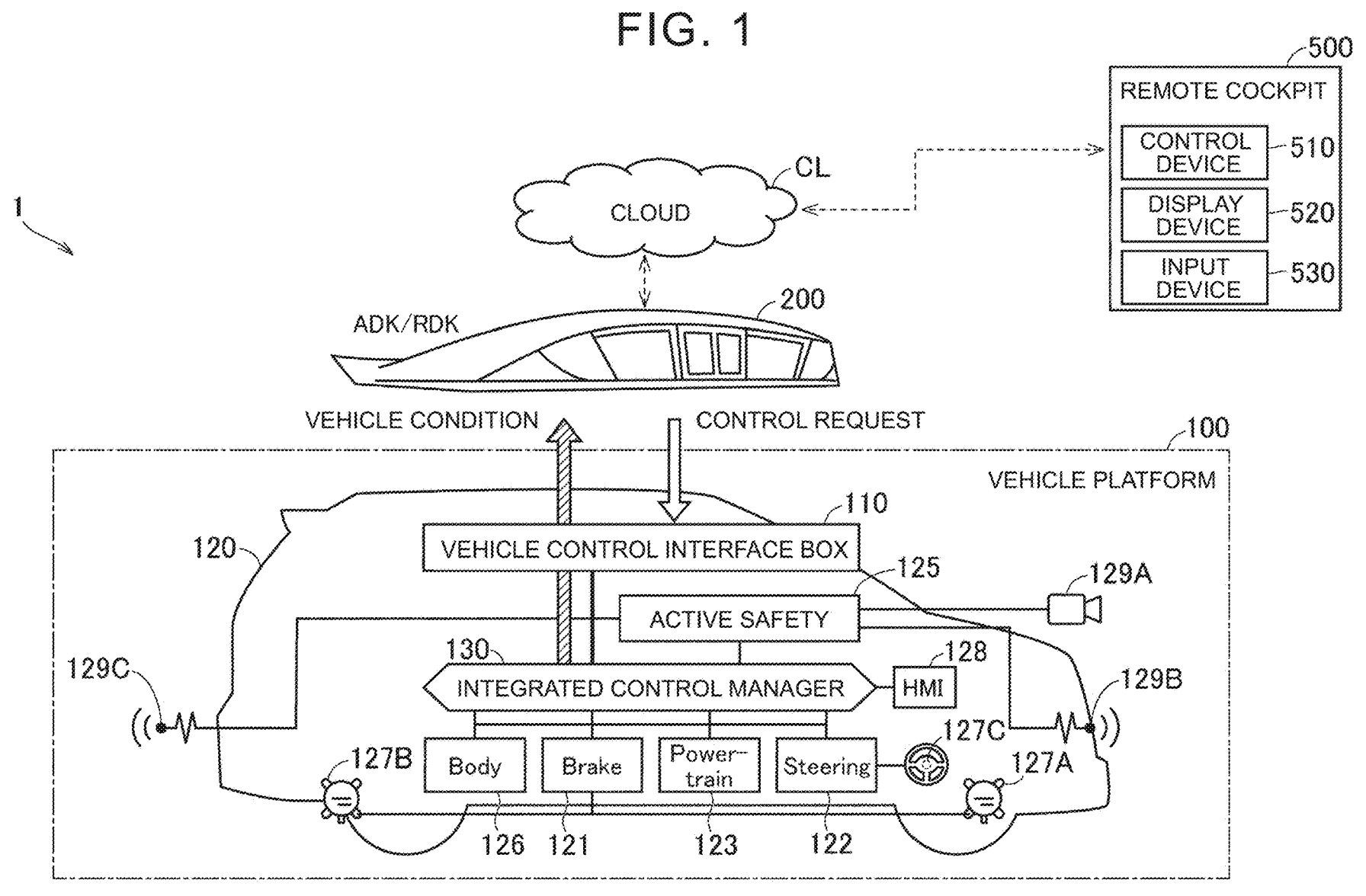

FIG. 1 is a diagram illustrating a schematic configuration of a vehicle 1 according to an embodiment of the present disclosure. Referring to FIG. 1, a vehicle 1 includes a vehicle platform (VP) 100 and autonomous driving module 200. The autonomous driving module 200 functions both as an Autonomous Driving Kit (ADK) for autonomous driving (i.e., autonomous driving of the vehicle alone) and as a Remote Driving Kit (RDK) for remote driving (i.e., autonomous driving based on signals from outside the vehicle). In the autonomous driving, the vehicle 1 can travel independently. According to the autonomous driving, the vehicle 1 can travel without receiving an instruction from the outside of the vehicle 1 or from a person (driver) inside the vehicle. The autonomous driving may be an automated driving commonly referred to as "fully automated driving". In the remote driving, the vehicle 1 can travel without receiving an instruction from a person (driver) in the vehicle. The vehicle 1 being remotely driven may travel based on an instruction from a device outside the vehicle, or may travel based on remote control by a person outside the vehicle. The travel plan for remote driving may be generated by the vehicle 1 based on a signal from the outside of the vehicle, or may be generated outside the vehicle 1 (for example, a cloud CL). In this embodiment, in both the autonomous driving and the remote driving, the vehicle 1 generates a travel plan for the automatic driving.

The control system of the vehicle 1 according to this embodiment includes a remote cockpit 500 outside the vehicle 1. The remote cockpit 500 includes a control device 510, a display device 520 that displays an environment of the vehicle 1 (for example, a surrounding scene and a road on which the vehicle is traveling), and an input device 530 that receives a remote operation (for example, a driving operation for traveling and an operation of a body system). The remote cockpit 500 may have a driver's seat similar to a general vehicle. The user can monitor and operate the vehicle 1 from a remote location by using the remote cockpit 500. The control device 510 of the remote cockpit 500 communicates with the vehicles 1 through a communication system (including a cloud CL). The cloud CL has the function of a computer and communicates with both the remote cockpit 500 and the vehicles 1. The cloud CL transmits a signal based on remote control to the input device 530 to the vehicle 1. Further, the cloud CL transmits a signal based on the information from the vehicles 1 to the remote cockpit 500. In this embodiment, a user (person) operates the vehicle 1 through the input device 530. However, the present disclosure is not limited thereto, and an artificial intelligence (AI) may remotely operate the vehicle 1 from the outside of the vehicle instead of the person. Note that the cloud CL may hold up-to-date map information and traffic information. Edge computing techniques may be utilized to reduce the amount of data processed by the cloud CL or to reduce delay times in remote driving.

VP 100 includes a vehicle control interface box (hereinafter referred to as "VCIB") 110 and a base vehicle 120. By adding VCIB 110 to the base-vehicle 120, a VP 100 is formed in which the autonomous driving module 200 can be attached and detached. Then, the autonomous driving module 200 is attached to VP 100 to complete the vehicle 1. VCIB 110 is configured to communicate with both the base vehicle 120 and the autonomous driving module 200 via a communication bus. In this embodiment, the autonomous driving module 200 is attached to the rooftop of the base vehicle 120. However, the mounting position of the autonomous driving module 200 can be changed as appropriate.

The base-vehicle 120 is, for example, a commercially available x electrified vehicle (EV). In this embodiment, battery electric vehicle (BEV) is employed as the base-vehicle 120. However, the present disclosure is not limited thereto, and the base-vehicle 120 may be a xEV other than BEV. The base vehicle 120 includes an Integrated Control Manager (ICM) 130, various systems for controlling the base vehicle 120, various sensors (a wheel speed sensor 127A, 127B, a steering angle sensor 127C, and the like), and a Human Machine Interface (HMI) 128. ICM 130 functions as a control device. ICM 130 integrates and controls various systems related to the operation of the base vehicle 120 based on the detection results of the in-vehicle sensors. HMI 128 includes an inputting device and a notification device. HMI 128 may include a navigation system.

Figure 2:
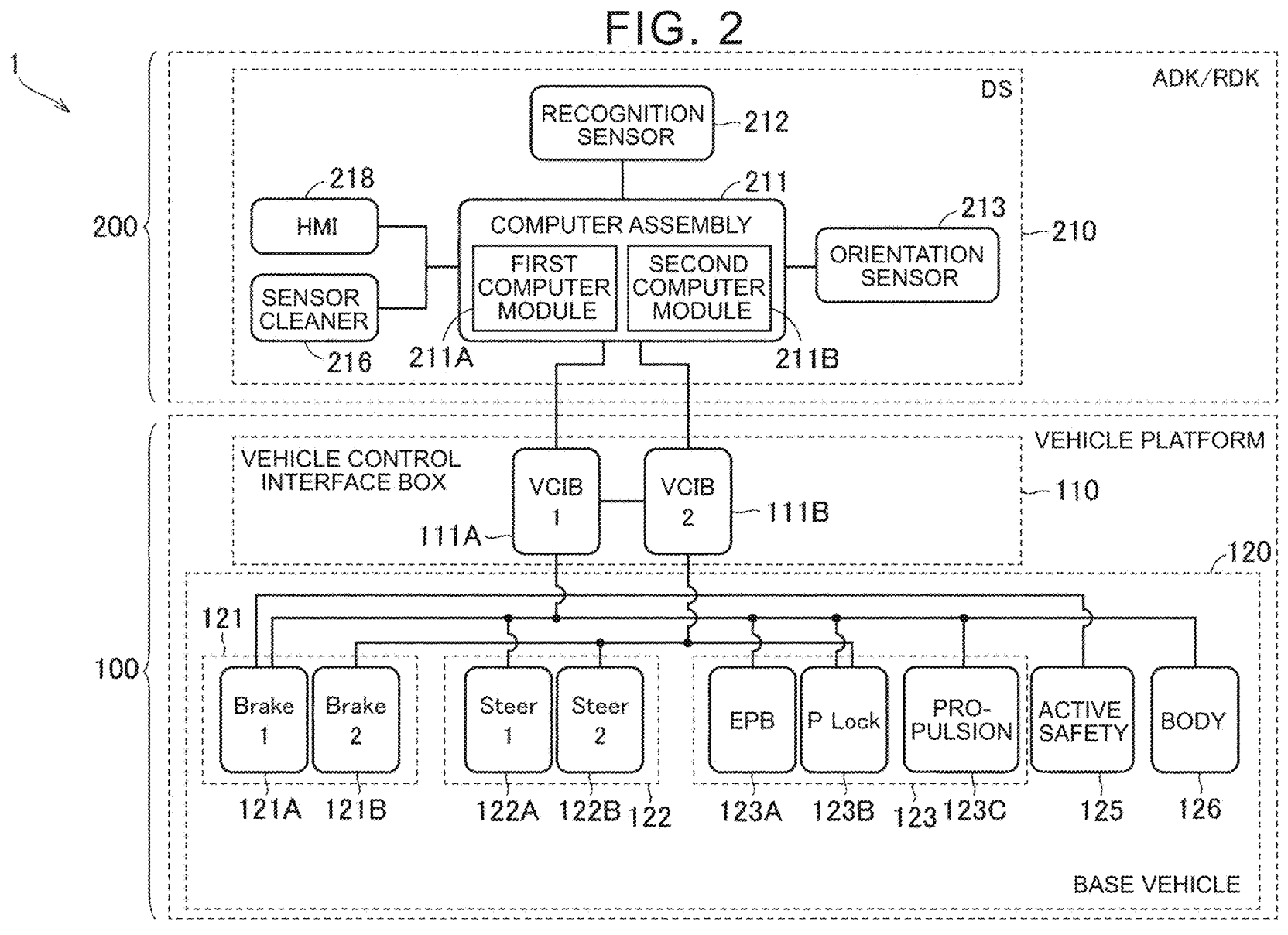

FIG. 2 is a diagram illustrating a control system inside the vehicle 1. Referring to FIG. 2 together with FIG. 1, the autonomous driving module 200 includes an autonomous driving system (hereinafter referred to as "DS") 210 for performing autonomous driving of the vehicle 1. DS 210 includes a computer assembly (hereinafter referred to as "DSCOM") 211, a recognition sensor 212, an attitude sensor 213, a sensor cleaner 216, and a Human Machine Interface (HMI) 218.

DSCOM 211 includes a first computer module (hereinafter referred to as "first CM") 211A and a second computer module (hereinafter referred to as "second CM") 211B. Each of the first CM 211A and the second CM 211B includes a processor and a storage device that stores autonomous driving software using an API, which will be described later, and is configured to be capable of executing autonomous driving software by the processor. DSCOM 211 switches between the autonomous driving and the remote driving according to the driving ID described later. Specifically, DSCOM 211 outputs a command related to autonomous driving when the value of the driving ID is "ADK", and outputs a command related to remote driving when the value of the driving ID is "RDK". The command from DSCOM 211 is sent to VP 100 through VCIB 110.

The recognition sensor 212 includes a sensor that acquires information (environmental information) indicating an external environment of the vehicle 1. The recognition sensor 212 may include at least one of a camera, a millimeter wave radar, and a lidar. The attitude sensor 213 acquires information (attitude information) regarding the attitude of the vehicle 1. The attitude sensor 213 may include various sensors for detecting acceleration, angular velocity, and position of the vehicle 1. HMI 218 includes an inputting device and a notification device.

The base vehicle 120 includes a brake system 121, a steering system 122, a powertrain system 123, an active safety system 125, and a body system 126. In this embodiment, the electronic control unit (hereinafter also referred to as "ECU") is provided.

In the vehicle 1, a control system related to the behavior (running, stopping, and bending) of the vehicle 1 has redundancy. The first CM 211A and the second CM 211B give instructions to the main-control system and the sub-control system, respectively. VCIB 110 includes a control unit (hereinafter referred to as "first VCIB") 111A of the main control system and a control unit (hereinafter referred to as "second VCIB") 111B of the sub-control system. Each control unit may include a computer including a processor and a storage device. The first VCIB 111A and the second VCIB 111B may be in direct communication with the respective devices or may be in communication via ICM 130 shown in FIG. 1.

The brake system 121 includes a brake mechanism, an operation unit that receives a brake operation from a driver, and a brake control unit 121A, 121B. The steering system 122 includes a steering mechanism, an operation unit that receives a steering operation from a driver, and a steering control unit 122A, 122B. The powertrain system 123 includes a shifting device, a vehicle drive, EPB device, a P-Lock device, a 123A of EPB controls, a 123B of P-Lock controls, and a 123C of propulsion controls. "EPB" means electric parking brake, and "P-Lock" means parking lock. The shift device determines the shift range and switches the propulsion direction and the shift mode of the base vehicle

120 according to the determined shift range. The shift device further includes, in addition to the transmission mechanism, an operation unit that receives a shift operation from the driver. The vehicle driving device includes a battery, a traveling motor that is supplied with electric power from the battery, and an operation unit that receives an accelerator operation from the driver, and applies a propulsive force in a propulsion direction indicated by the shift range. P-Lock device further includes an operation unit that receives a parking operation from the driver in addition to the parking lock mechanism and the actuator.

Active safety system 125 includes a Pre Collision Safety (PCS) system. PCS system prevents a collision when it is determined that there is a risk of a collision with respect to the vehicle 1. ECU of the active safety system 125 determines the likelihood of a crash for the running vehicles 1. The base-vehicle 120 comprises a camera 129A and radar sensor 129B, 129C (FIG. 1) for detecting crash risks. ECU of the active safety system 125 uses the received signals from the camera 129A and radar sensor 129B,129C to determine whether there is a crash risk. If it is determined that there is a crash risk, ECU activates PCS.

In this embodiment, a signal (API signal) defined in Application Program Interface (API) is used for communication between DS 210 and VCIB 110. DS 210 is configured to process various types of signals defined in API. DS 210 outputs various commands to VCIB 110 in accordance with API. Hereinafter, each of the various commands outputted from DS 210 to VCIB 110 is also referred to as an "API command". DS 210 also receives from VCIB 110 various signaling indicative of the status of the base-vehicle 120 in accordance with API. Hereinafter, each of the above-described various types of signals received by DS 210 from VCIB 110 is also referred to as "API status". Both API command and API statuses correspond to API.

In this embodiment, DS 210 uses API commands described below. The vehicular mode command is an API command requesting a transition to an automated mode or a manual mode. The automatic mode and the manual mode will be described later. The propulsion direction command is an API command requesting switching of a shift range (R/D). The acceleration command is an API command for instructing the acceleration of the vehicle. The acceleration command requests acceleration (+) and deceleration (−) with respect to a direction indicated by a propulsion direction status to be described later. The immobilization command is an API command requesting application or removal of immobilization. The application of immobilization means that EPB is in ON state (operating state) and the shift range is in the P (parking) state.

Some API commands used in the vehicles 1 have been described above. VCIB 110 receives various API commands from DS 210. Upon receiving API command from DS 210, VCIB 110 converts API command into a form of a signal executable by the controller of the base vehicle 120. Hereinafter, API command converted into the format of the signal executable by the control device of the base vehicle 120 is also referred to as an "in-house command". When VCIB 110 receives API command from DS 210, it outputs an inside command corresponding to API command to the base-vehicle 120.

Next, API status will be described. DS 210 grasps the status of the base-vehicle 120 using, for example, API status described below.

The vehicle mode status is an API status indicating a vehicle mode status. The vehicle mode includes a manual mode and an automatic mode. The manual mode is a vehicle mode in which the vehicle is under the control of the driver (human). The automatic mode is a vehicle mode in which the vehicle platform (including the base vehicle) is under control of the autonomous driving kit. In the initial state, the vehicle mode is the manual mode. The driver can select a desired vehicle-mode through the in-vehicle HMI.

The propulsion direction status is an API status indicating the present shift range. The traveling direction status is an API status indicating a traveling direction of the vehicle. The vehicle speed status is an API status indicating a vertical speed of the vehicle, and outputs an absolute value of the vehicle speed. The immobilization status is an API status that indicates a state of immobilization (e.g., a state of EPB and shifting P).

The driving identification status (hereinafter, referred to as "driving ID") is an API status indicating whether communication between DS 210 (DSCOM 211) and VCIB 110 (first VCIB 111A and second VCIB 111B) is communication for autonomous driving or communication for remote driving. The driving ID outputs the value "ADK" during the autonomous driving and the value "RDK" during the remote driving. Such a driving ID makes it easier to achieve both autonomous driving and remote driving.

Some API statuses used in the vehicles 1 have been described above. VCIB 110 receives various sensor detection values and state determination results from the base vehicle 120, and outputs various API statuses indicating the state of the base vehicle 120 to DS 210. VCIB 110 acquires API status in which the status indicating the status of the base-vehicle 120 is set, and outputs the obtained API status to DS 210.

In the above-described vehicles 1, a VCIB 110 for receiving control data from a DS 210 is provided. In addition to this VCIB 110, an ICM 130 is provided which receives a command from VCIB 110 and controls the traveling of the vehicles. It is conceivable that ICM 130 controls the limp-home travel when the limp-home travel of the vehicles 1 is executed. During the control of the limp-home travel by ICM 130, it is considered that the control of the limp-home travel and the control according to the control demand from VCIB 110 interfere with each other.

Therefore, the program for the vehicle control executed by VCIB 110 causes the processor of VCIB 110 to execute the step of executing a process for starting the limp-home travel by ICM 130 that differs from VCIB 110 on condition that the communication between VCIB 110 and DS 210 is disabled, and the step of switching from the automated driving mode to the manual driving mode on condition that the limp-home travel by ICM 130 is started.

Accordingly, VCIB 110 vehicular mode is switched from the autonomous driving mode to the manual driving mode on condition that the limp-home travel by ICM 130 is started. Therefore, no control requirement is issued from VCIB 110 to ICM 130. Consequently, it is possible to prevent the control of the limp-home travel by ICM 130 from interfering with the control requested by VCIB 110.

FIG. 3 is a flow chart illustrating a flow of a linker-side process executed by VCIB 110. Referring to FIG. 3, the program of this processing is stored in the storage device of the first VCIB 111A, and is called and executed by the processor of the first VCIB 111A from the higher-level processing at predetermined intervals. Here, the programming of this process is executed by the first VCIB 111A, but may be executed by the second VCIB 111B or may be executed by both.

The processor of the first VCIB 111A determines whether RDK is in the autonomous driving mode (S111). When it is determined that RDK is not in the autonomous driving mode
(NO by S111), the processor of the first VCIB 111A returns
the processing to be executed to the higher-level processing.

On the other hand, when it is determined that RDK is in
the autonomous driving mode (YES in S111), the processor
of the first VCIB 111A determines whether or not the
communication between DS 210 and the first VCIB 111A
has been interrupted (S112). If it is determined that com-
munication is interrupted (YES in S112), the processor
determines whether communication between DS 210 and the
second VCIB 111B is interrupted (S113).

When it is determined that the communication between
DS 210 and first VCIB 111A is not interrupted (NO in S112),
or when it is determined that the communication between
DS 210 and second VCIB 111B is not interrupted (NO in
S113), the processor of the first VCIB 111A controls the
steering system 122 via ICM 130 such that the first VCIB
111A and the second VCIB 111B execute the steering angle
control according to the command from RDK (S117), and
proceeds to S121.

If it is determined that the communication between DS
210 and the second VCIB 111B is interrupted (YES in
S113), the processor determines whether or not RDK limp-
aside control is started (S114). RDK limp-aside control is a
control for automatically stopping the vehicle 1 by appro-
priately executing the limp-home travel of the vehicle 1
when the control of RDK is lost. If it is determined that RDK
limp-aside control is not started (YES in S114), the proces-
sor controls (S116) the steering system 122 via ICM 130 so
that the first VCIB 111A and the second VCIB 111B main-
tain the final actual steering angle before the communication
is interrupted, and proceeds to S121. If it is determined that
RDK limp-aside control is not started (NO by S114), the
process to be executed proceeds to S121.

FIGS. 4A and 4B are diagrams for describing transitions
in steering angle control when communication between DS
210 and VCIB 110 is interrupted. FIG. 4A is a diagram
illustrating a case in which, after communication is inter-
rupted, no control unit controls the steering angle prior to
starting RDK limp-aside control. FIG. 4B is a diagram
showing the cases where VCIB 110 controls the steering
angle prior to starting RDK limp-aside control after the
communication is interrupted. In FIGS. 4A and 4B, the
abscissa is a time-axis. The upper graph of each of FIGS. 4A
and 4B shows the change in the steering angle, and the lower
graph shows the lateral ID indicating whether or not to
output the steering command from VCIB 110. If the lateral
ID is 41, a steering command is output from VCIB 110, and
if it is 0, a steering command is not output from VCIB 110.
In the graph showing the change in the steering angle, the
graph above shows the steering angle of the steering demand
from RDK, and the graph below shows the actual steering
angle at present.

Referring to FIG. 4A, when the communication is inter-
rupted due to the disconnection of both buses connecting DS
210 and VCIB 110 (not the actual disconnection, but the
same condition as the disconnection), and then no control
unit controls the steering angle prior to the initiation of RDK
limp-aside control, the steering angle attempts to return to
the straight-ahead direction when the vehicle 1 is moving
forward by the self-centering action. In the figure, it is
slightly returned from the left to the center. However, the
returning direction of the steering angle is not constant
depending on the original steering angle, the vehicle speed,
and the like as shown in the drawing. Therefore, it is difficult
to determine what kind of steering angle is to be used for the
first instruction when the steering angle control by ICM 130 is started. For example, when the steering angle first
instructed by ICM 130 is the final actual steering angle at the
time of communication interruption, since the actual steer-
ing angle has already deviated from the final actual steering
angle, the turning behavior of the vehicle 1 becomes uncom-
fortable in order to return the steering angle.

On the other hand, referring to FIG. 4B, when the
communication is interrupted due to the disconnection of
both buses connecting DS 210 and VCIB 110, and then
VCIB 110 performs the steering angle control prior to the
beginning of RDK limp-side control, VCIB 110 continues
the control by keeping the lateral ID at 41. Then, VCIB 110
performs control so as to maintain the final actual steering
angle when the communication is interrupted. For example,
when the steering angle indicated first when the steering
angle control by ICM 130 is started is the final actual
steering angle at the time of communication interruption, the
actual steering angle is maintained, and thus the turning
behavior of the vehicle 1 becomes smooth.

Returning to FIG. 3, the processor of the first VCIB 111A
determines whether or not RDK limp-aside control is being
performed (S121). If it is determined that RDK limp-aside
control is in progress (YES in S121), the processor does not
perform steering control (S122). That is, since ICM 130
executes the rip-aside control regardless of the control from
VCIB 110, VCIB 110 does not execute the steering control
so as not to interfere with the control.

The processor then S123 to determine whether a decel-
eration procedure is in progress by ICM 130. The processor
determines by ICM 130 whether or not a stop holding
procedure is being performed when it is determined by ICM
130 that a deceleration procedure is not being performed
(NO in S123) (S124).

If ICM 130 determines that a deceleration procedure is in
progress (YES in S123) or a stop holding procedure is in
progress (YES in S124), the processor of the first VCIB
111A switches the vehicular mode from the auto mode to the
manual mode (S125).

If it is determined that RDK limp-aside control is not in
progress (NO in S121), if it is determined that the vehicle is
not in the stop holding process (NO in S124), or after S125,
the processor of the first VCIB 111A returns the process to
be executed to the higher-level process.

Modified Examples (1) In the above-described embodiment, as shown in S111
of FIG. 3, the process after S112 is executed when RDK is
in the auto-mode. However, the present disclosure is not
limited thereto, and S112 and subsequent processes may be
executed even when ADK is in the auto-mode.

(2) In the above-described embodiment, ICM 130 per-
forms RDK limp-aside control. However, the present dis-
closure is not limited to this, and the above-described
disclosure can also be applied to cases where RDK limp-
aside control is executed by a control device different from
VCIB 110 and is executed by a control device different from
ICM 130.

(3) In the above-described embodiment, as shown in S115
of FIG. 3, the final actual steering angle is maintained by
VCIB 110 prior to starting RDK limp-aside control. How-
ever, the present disclosure is not limited thereto, and the
steering angle may be controlled by VCIB 110 in accordance
with a predetermined function. The predetermined function
may be, for example, a function such that the steering angle
decreases in proportion to time.

Summary (1) As illustrated in FIGS. 1 to 3, the vehicle control
program is executed in a VCIB 110 connected between DS 210 and a VP 100 that performs autonomous driving in accordance with a command from DS 210. As illustrated in FIGS. 1 and 2, VCIB 110 includes a memory in which a program including a predetermined API defined for each signal is stored, and a processor that controls a VP 100 in response to an instruction from a DS 210 by executing the program. As shown in FIG. 2, VCIB 110 has a manual mode and an automated mode as the vehicular mode. As illustrated in FIG. 2, VP 100 can accept manual driving in the manual mode, and can accept a command from DS 210 in the automated mode. As illustrated in FIG. 3, the vehicle control program causes the processor to execute a step (for example, S112,S113,S116) of executing a process for starting the limp-home travel by a ICM 130 that differs from VCIB 110 on condition that communication between DS 210 and VCIB 110 is disabled, and a step (for example, S121,S125) of switching from the auto mode to the manual mode on condition that the limp-home travel by ICM 130 is started.

Accordingly, VCIB 110 vehicular mode is switched from the auto mode to the manual mode on condition that the limp-home travel by ICM 130 is started. Therefore, no control requirement is issued from VCIB 110 to ICM 130. Consequently, it is possible to prevent control of the limp-home travel by ICM 130 from interfering with the control requested by VCIB 110.

(2) As illustrated in FIG. 3, the vehicle control program may cause the processor to execute the steps of switching from the auto mode to the manual mode (for example, S121 to S125) on condition that the limp-home travel by ICM 130 is started and the deceleration treatment is being performed or the stop holding treatment is being performed.

As a result, VCIB 110 vehicular mode is switched from the auto mode to the manual mode on condition that the limp-home travel by ICM 130 is started and the deceleration treatment or the stop holding treatment is being performed. Consequently, it is possible to prevent the control of the limp-home travel by ICM 130 and the control according to the control demand from VCIB 110 from interfering with each other more accurately.

(3) As illustrated in FIG. 3, the vehicle control program may cause the processor to execute the steps (for example, S115) in which VCIB 110 executes the steering angle control after executing the process for starting the limp-home travel by ICM 130 and until the limp-home travel by ICM 130 is started.

Accordingly, it is possible to avoid a situation in which the steering angle control is not appropriately executed after executing the process for starting the limp-home travel by ICM 130 and until the limp-home travel by ICM 130 is started.

(4) As illustrated in FIG. 3, the vehicle control program may cause the processor to execute the step (for example, S115) of executing the control for maintaining the final actual steering angle as the steering angle control to be executed after executing the process for starting the limp-home travel until the limp-home travel by ICM 130 is started.

Thus, after the execution of the process for starting the limp-home travel by ICM 130, until the limp-home travel by ICM 130 is started, it can be held at the steering angle when the limp-home travel is started. As a result, it is possible to smoothly shift to the limp-home travel.

(5) As illustrated in FIG. 3, the vehicle control program may cause the processor to execute the steps of VCIB 110 executing the steering angle control (for example, S117) when DS 210 and VCIB 110 are capable of communicating with each other.

Thus, the steering angle control can be appropriately executed by VCIB 110 when communication between VCIB 110 and DS 210 is enabled.

The embodiments disclosed herein should be considered to be exemplary and not restrictive in all respects. It is intended that the scope of the disclosure be defined by the appended claims rather than the description of the embodiments described above, and that all changes within the meaning and range of equivalency of the claims be embraced therein.

What is claimed is:

1. A non-transitory storage medium storing a vehicle control program executed by a vehicle control device connected between an autonomous driving system and a travel control device different from the vehicle control device that performs autonomous driving according to an instruction from the autonomous driving system, wherein:

the vehicle control device includes a memory that stores a program that includes a predetermined application program interface defined for each signal, and a processor that controls the travel control device according to the instruction from the autonomous driving system by executing the program;

the vehicle control device includes a manual driving mode and an autonomous driving mode as vehicle modes, the vehicle control device being configured to stop control of the travel control device in the manual driving mode;

the travel control device is capable of receiving a manual driving operation in the manual driving mode, and receiving the instruction from the autonomous driving system in the autonomous driving mode; and the vehicle control program causes the processor to execute a process of determining whether communication between the vehicle control device and the autonomous driving system is disabled, execute a process of causing the travel control device to start limp-home travel based on determining that the communication between the vehicle control device and the autonomous driving system is disabled, execute steering angle control after the process of determining whether the communication between the vehicle control device and the autonomous driving system is disabled and until the limp-home travel is started by the travel control device, and switch from the autonomous driving mode to the manual driving mode based on the limp-home travel being started by the travel control device.

2. The non-transitory storage medium according to claim 1, wherein the vehicle control program causes the processor to switch from the autonomous driving mode to the manual driving mode based on the limp-home travel being started by the travel control device and a vehicle is being decelerated or kept stationary.

3. The non-transitory storage medium according to claim 1, wherein the vehicle control program causes the processor to execute control for maintaining a final actual steering angle as the steering angle control executed after the process of determining whether the communication between the vehicle control device and the autonomous driving system is disabled and until the limp-home travel is started by the travel control device.

4. The non-transitory storage medium according to claim 1, wherein the vehicle control program causes the processor to cause the vehicle control device to execute steering angle control when communication between the vehicle control device and the autonomous driving system is enabled.

5. The non-transitory storage medium according to claim 1, wherein the vehicle control program causes the processor to execute steering angle control until the limp-home travel is started by the travel control device, based on determining that the communication between the vehicle control device and the autonomous driving system is disabled.

6. The non-transitory storage medium according to claim 5, wherein the vehicle control program causes the processor to execute control for maintaining a final actual steering angle as the steering angle control until the limp-home travel is started by the travel control device, based on determining that the communication between the vehicle control device and the autonomous driving system is disabled.

7. The non-transitory storage medium according to claim 1, wherein vehicle control device includes a first vehicle control device and a second vehicle control device, and wherein the process of determining whether the communication between the vehicle control device and the autonomous driving system is disabled includes determining whether a communication between the first vehicle control device and the autonomous driving system is disabled, and whether a communication between the second vehicle control device and the autonomous driving system is disabled.

8. The non-transitory storage medium according to claim 7, wherein the process of causing the travel control device to start the limp-home travel is based on determining that the communication between the first vehicle control device and the autonomous driving system is disabled, and based on determining that the communication between the second vehicle control device and the autonomous driving system is disabled.

9. The non-transitory storage medium according to claim 1, wherein the vehicle control program causes the processor to execute a process of determining whether the limp home travel is being performed by the travel control device, and based on determining that the limp home travel is being performed by the travel control device, not executing the steering angle control so as to not interfere with the limp home travel being performed by the travel home device.

* * * * *